United States Patent [19]

Corley

[11] 4,309,515

[45] Jan. 5, 1982

[54] TRANSLUCENT IMPACT POLYMERS

[75] Inventor: Larry S. Corley, Houston, Tex.

[73] Assignee: Shell Oil Company, Houston, Tex.

[21] Appl. No.: 175,556

[22] Filed: Aug. 5, 1980

[51] Int. Cl.³ ............................................ C08F 279/02
[52] U.S. Cl. ..................................................... 525/316
[58] Field of Search ......................................... 525/316

[56] References Cited

U.S. PATENT DOCUMENTS

| | | | |
|---|---|---|---|
| 3,781,383 | 12/1973 | Finestone et al. | 525/316 |
| 3,957,915 | 5/1976 | Spanswick | 423/242 |
| 3,987,124 | 10/1976 | Hardwick et al. | 525/316 |
| 3,987,125 | 10/1976 | Slama | 525/316 |
| 4,026,969 | 5/1977 | Mostert et al. | 525/316 |
| 4,081,497 | 3/1978 | Tokumitsu et al. | 525/316 |
| 4,100,227 | 7/1978 | Bredeweg et al. | 521/139 |

*Primary Examiner*—William F. Hamrock
*Attorney, Agent, or Firm*—Dean F. Vance

[57] ABSTRACT

Vinyl aromatic compositions having improved impact and translucency are prepared by the interpolymerization of a monovinyl aromatic monomer and a high cis-content polybutadiene rubber in the presence of certain free-radical initiators.

5 Claims, No Drawings

TRANSLUCENT IMPACT POLYMERS

It has long been known that the brittle nature of poly(monovinyl aromatic) polymers such as polystyrene is overcome by incorporating a minor amount of rubber. The rubber is largely incompatible with the polymeric vinyl compounds resulting in a two-phase system comprising a dispersed rubbery phase and a poly(monovinyl aromatic) matrix. However, while the impact values are improved, the resulting polymer also has an increased haze (reduced translucency). Efforts to bring about an acceptable balance between haze, impact and cost have not yet been totally successful.

Belgian Pat. No. 852,793, discloses a process for making an impact polymer possessing a certain degree of transparency by employing a styrene-butadiene block (or graft) copolymer. However, the use of such a block copolymer is not preferred due to the high costs involved and the difficulty in obtaining a good balance between transparency and impact. U.S. Pat. Nos. 3,957,915, 3,987,125 and 4,100,227 disclose the use of certain bromine-containing compounds and rubbers to give transparency to high impact polystyrenes. However, the use of such bromine compounds is also not preferred since such compounds are generally toxic and form HBR upon decomposition, therein causing potential corrosion problems.

It has now been discovered that by the use of certain free-radical initiators and rubbers, a polymer may be obtained that has an unexpectedly good balance of toughness and translucency.

* SUMMARY OF THE INVENTION

The present invention contemplates a process for the preparation of an improved impact polymer possessing an excellent balance of impact and translucency. Further, in a preferred embodiment the polymer produced according to the present invention has a novel and nonobvious mixed morphology. Specifically the present invention comprises the following steps:

(a) preparing a solution of about 4 to about 12 parts by weight of a polybutadiene rubber per 100 parts by weight of combined rubber and monovinyl aromatic monomer, said polybutadiene rubber having a cis-1,4 content of about 80% to about 98%, a trans-1,4 content of about 1% to about 19%, and a vinyl-1,2 content of about 1% to about 19%;

(b) heating the resulting solution with agitation and in the presence of about 0.01 to about 1 mole percent (based on the moles of monovinyl aromatic) of a free-radical initiator selected from the group consisting of aliphatic peroxyesters, aromatic peroxyesters and peroxyketals until about 25 to about 50 weight percent of the monovinyl aromatic is converted to polymer; and (c) subsequently polymerizing the resulting mixture in the absence of additional agitation until about 75 to about 98 weight percent conversion of monomer to polymer, to provide a monovinyl aromatic polymer having an improved balance of translucency and impact, the structure of the monovinyl aromatic polymer comprising a continuous matrix of poly(monovinyl aromatic) having a dispersed phase of a reinforcing polybutadiene rubber, the rubber being present in a proportion of about 4 to about 12 parts by weight per one hundred parts by weight of the combined poly(monovinyl aromatic) and rubber, the rubber being in the form of a plurality of particles of generally cellular structure and containing occlusions of poly(monovinyl aromatic), the particles being a mixture of coil-shaped, capsule-shaped and bar-shaped particles having a weight average particle diameter not exceeding two microns and cell walls not greater than about 0.05 microns in thickness, the resulting polymer having a toughness-haze index of greater than about 30.

There are a number of novel and significant aspects to the present invention. For one, the selection of the rubber component is important for the attainment of the optimum balance of properties along with the novel mixed morphology. The rubber is a polybutadiene rubber having a cis-1,4 content of about 80% to about 98%, a trans-1,4 content of about 1% to about 19%, and a vinyl-1,2 content of about 1% to about 19%. As shown in Illustrative Embodiment II, the use of the rubber according to the present invention (run 13972-121) results in the highest toughness-haze index (42). Run 13742-138 gave a comparable toughness-haze value (42) but required 50% more rubber (9% versus 6%). When the same amount of rubber is employed (comparing run 13972-121 against run 13972-115), the polymer according to the present invention gives an index value of 42 compared to 29 for the polymer outside the scope of the invention.

Another important aspect of the present invention lies in the selection of the particular initiators. The initiators employed herein are selected from the group consisting of aliphatic peroxyesters, aromatic peroxyesters and peroxyketals. As shown in Illustrative Embodiment I, the selection of the particular initiator to be employed has a significant effect upon the resulting properties of the polymer. In a specific embodiment, preferred initiators include OO-t-butyl O-isopropyl monoperoxycarbonate, t-butyl peroxybenzoate and 1,1-bis (t-butylperoxy)-3,3,5-trimethylcyclohexane. A much preferred initiator is t-butyl peroxybenzoate.

DETAILED DESCRIPTION OF THE INVENTION

The monovinyl aromatic compounds which can be employed in producing the rubber modified polymers according to the invention include monovinyl aromatic compounds having the vinyl radical i.e., they ethylenically unsaturated radical, attached directly to a carbon atom of the aromatic nucleus. Styrene is the preferred monovinyl aromatic compound. Examples of other compounds applicable herein are the alkyl and dialkyl derivatives of styrene such as the dimethylstyrenes, ethylstyrenes, isopropylstyrenes, butyl-styrenes, etc.; the halogen derivatives of styrene, for example, chloro- and dichlorostyrene and the mono- and dibromostyrenes and alkylhalostyrenes as well as mixtures of these compounds with styrene or with each other. Alphamethylstyrene may be substituted in a minor amount, for example 2 to 30% by weight, preferably from about 5 to 25% in the total composition for a portion of the monovinylaromatic monomer to improve properties of the interpolymers such as heat distortion temperature.

Broadly the polymerized vinyl aromatic component comprises from about 88 to about 96% by weight of the final composition; in a more preferred aspect it comprises from about 91 to 94%.

The unvulcanized synthetic rubber materials used in preparing the interpolymer compositions according to the invention are certain high cis content polybutadiene rubbers. The butadiene homopolymers employed to prepare the interpolymers have a microstructure of 80% to 98% cis 1,4 content, 1% to 19% trans 1,4 content and 1% to 19% vinyl 1,2 content. Preferred polymers have a microstructure of 90% to 98% cis 1,4, 1% to 9% trans 1,4 and 1% to 9% vinyl 1,2. The microstructure of the polybutadiene is conveniently determined by infrared technique on solution of the elastomers in carbon disulfide, e.g., according to the procedure of Silas et al., Analytical Chemistry, Volume 31, page 529 (1959). Preferred are rubbers having an intrinsic viscosity in the range of about 0.9 to about 2.5, and most preferably 1.6 to about 2.2 dl/g in toluene at 30° C.

Commercial polybutadiene rubbers include Taktene 1202 rubber from Polysar which has a microstructure of about 98% cis 1,4, 1% trans 1,4 and 1% vinyl 1,2. These polymers are highly branched and have a very broad molecular weight distribution.

The amount of polybutadiene rubber employed is about 4% to about 12% by weight in the polymerization mixture preferably about 6% to about 9%.

Another critical aspect of the present invention involves the selection of the particular free-radical initiator. Preferred initiators are aliphatic peroxyesters, aromatic peroxyesters and peroxyketals. Representative aliphatic peroxyesters, aromatic peroxyesters and peroxyketals (along with other initiators not covered herein) are included below in Table 1.

TABLE 1
Initiator Formulations Used

| Abbreviation | Initiator | Structure | Wt. % Initiator | Diluent[a] | Trade Name |
|---|---|---|---|---|---|
| Azo Compounds: | | | | | |
| AIBN | 2,2'azobisisobutyronitrile | $N\equiv C-C(CH_3)_2-N=N-C(CH_3)_2-C\equiv N$ | | | |
| Diacyl Peroxides: | | | 25 | DMP | |
| APO | acetyl peroxide | $CH_3\overset{O}{\overset{\parallel}{C}}OO\overset{O}{\overset{\parallel}{C}}CH_3$ | | | |
| LPO | lauroyl peroxide | $n\text{-}C_{11}H_{23}\overset{O}{\overset{\parallel}{C}}OO\overset{O}{\overset{\parallel}{C}}C_{11}H_{23}\text{-}n$ | | | Alperox-F |
| BPO | benzoyl peroxide | $C_6H_5\overset{O}{\overset{\parallel}{C}}OO\overset{O}{\overset{\parallel}{C}}C_6H_5$ | | | Lucidol-98 |
| Aliphatic Peroxyesters: | | | 70 | OMS | Lupersol 70 |
| TBPA | t-butyl peroxyacetate | $(CH_3)_3COO\overset{O}{\overset{\parallel}{C}}CH_3$ | 50 | OMS | Lupersol PMS |
| TBPO | t-butyl peroxy-(2-ethylhexanoate) | $(CH_3)_3COO\overset{O}{\overset{\parallel}{C}}CH(C_2H_5)(n\text{-}C_4H_9)$ | | | |
| bis(TBPO) | 2,5,-dimethyl-2,5,-bis-(2-ethylhexanoylperoxy)hexane | $[(n\text{-}C_4H_9)(C_2H_5)CH\overset{O}{\overset{\parallel}{C}}OOC(CH_3)_2CH_2-]_2$ | | | Lupersol 256 |
| TBIC | OO-t-butyl O-isopropyl monoperoxycarbonate | $(CH_3)_3COO\overset{O}{\overset{\parallel}{C}}OCH(CH_3)_2$ | 75 | OMS | Lupersol TBIC-M75 |
| Aromatic Peroxyesters: | t-butyl peroxybenzoate | $(CH_3)_3COO\overset{O}{\overset{\parallel}{C}}C_6H_5$ | | | |
| TBPB | | | 50 | DMP | Lupersol KDB |
| | di-t-butyl diperoxyphthalate | $1,2\text{-}C_6H_4[\overset{O}{\overset{\parallel}{C}}OOC(CH_3)_3]_2$ | | | Luperox 118 |
| bis(TBPB) | 2,5-dimethyl-2,5-bis-(benzoylperoxy)hexane | $[C_6H_5\overset{O}{\overset{\parallel}{C}}OOC(CH_3)_3CH_2-]_2$ | | | |
| Dialkyl Peroxides: | | | | | |
| DITBP | di-t-butyl peroxide | $(CH_3)_3COOC(CH_3)_3$ | | | |
| bis(DITBP) | 2,5-dimethyl-2-5,bis-(t-butylperoxy)hexane | $(CH_3)_3COOC(CH_3)_2CH_2CH_2C(CH_3)_2OOC(CH_3)_3$ | | | Lupersol 101 |
| DICUP | dicumyl peroxide | $C_6H_5(CH_3)_2COOC(CH_3)_2C_6H_5$ | | | |
| Peroxyketals: | | | | | |
| | 2,2-bis(t-butylperoxy)butane | $(CH_3)_3COOC(CH_3)(C_2H_5)OOC(CH_3)_3$ | | DOP | Lupersol 220-D50 |
| | 1,1-bis(t-butylperoxy)cyclohexane | $(CH_3)_3COOCOOC(CH_3)_3$ ⬡ | 80 | BBP | Lupersol 331-80B |
| | 1,1-bis(t-butylperoxy)-3,3,5-trimethylcyclohexane | | | | Lupersol 231 |
| Methyl Ethyl Ketone Peroxide | | (Mixture) | 60 | DMP | Lupersol DDM |

[a] OMS = odorless mineral spirits (aliphatic hydrocarbon mixture);
DMP = dimethyl phthalate;
DBP = dibutyl phthalate;
DOP = dioctyl phthalate;
BBP = butyl benzyl phthalate.

The preferred aliphatic peroxyester is TBIC, the preferred aromatic peroxyester is TBPB and the preferred peroxyketal is 1,1-bis (t-butylperoxy)-3,3,5-trimethylcyclohexane. The most preferred initiator is TBPB because of its lower cost and excellent performance.

The amount of initiator employed is about 0.01 to about 1 mole percent based on the amount of monovinyl aromatic monomer, preferably about 0.01 to about 0.1 mole percent, most preferably about 0.02 to about 0.07 mole percent.

The interpolymers according to the invention are prepared by mixing the polybutadiene elastomer with the vinyl aromatic monomer and initiator in the desired proportions and commencing the polymerization. Best results are obtained when the elastomer is dissolved with monomer prior to polymerization in a bulk polymerization process.

Antioxidants, chain regulators, lubricants, and fillers inert to the reaction can also be added. Examples of suitable antioxidants include 2.6-di-tert-butyl-4-methylphenol and trisnonylphenylphosphite, which may be added in amounts from about 0.1 to about 2% by weight of the total reaction mixture and preferably in amounts from about 0.25 to 1%. Light stabilizers such as 2-alkyl-2,3,4-benzotriazole may also be incorporated into the polymerization mass. Suitable chain transfer agents include sulfhydryl compounds, e.g., dodecylmercaptan and 2-mercaptoethanol. Preferred are alkyl mercaptans having from about 8 to 20 carbon atoms per molecule or mixtures of these which can be added to the reaction mixture in amounts from about 0.0005 up to about 1% weight. The preferred concentration of mercaptan is from about 0.015 to about 0.05 weight percent. The polymerization may be carried out in the presence of small amounts of other compounds which are known to be useful in preparing molding compositions. This includes low concentrations of diluents, lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

While any of the known polymerization techniques can be used in the practice of this invention, in the preferred methods, the polymerization is conducted in bulk, solution and/or suspension, with bulk being most preferred. Further, the process can be either a batch type reaction and/or a continuous reaction, with batch type being most preferred.

Good results are obtained by heating the solution to a temperature of from about 80° to about 180° C., preferably 100° C. to 140° C., for a time sufficient to polymerize substantially all of the vinyl aromatic compound. Generally speaking, bulk polymerization for high impact compositions requires agitation for temperature control of the first polymerization stage and for proper dispersal of the rubbery material as it undergoes phase inversion, i.e., precipitates from the solution during this early polymerization step. Conversion in the first stage is about 25 to 50% of the monovinyl aromatic, with agitation. Typically there is no agitation in the second or subsequent stages.

After the polymerization is complete the product may contain a small amount, e.g., about 1 to 2% of unpolymerized monovinyl aromatic compound. As the presence of monomer has an adverse affect on impact properties, this is preferably removed by any of the known methods for removing residual monomer. Such methods include, e.g., subjecting the interpolymer to vacuum, e.g., in a devolatilizing extruder.

The invention is further illustrated by reference to the following Illustrative Embodiments, which are given for the purpose of illustration only and are not meant to limit the invention to the particular reactants and conditions employed therein.

MATERIALS

Peroxides were obtained from the Lucidol Division of Pennwalt Corporation as 450 g samples, in some cases containing a diluent (Table 1).

Elastomers used included Firestone Diene 55 [medium-cis (about 35% cis 1,4) polybutadiene], Polysar Taktene 1202 [high-cis (about 98% cis 1,4) polybutadiene], and Firestone Stereon 720 (butyllithium-initiated SBR containing 10 weight % styrene units).

The monovinyl aromatic was styrene monomer containing 50 ppm t-butylcatechol inhibitor.

PROCEDURE

Polymerizations were conducted batchwise on either a 300-gram or a 650-gram scale in glass jar reactors stirred with double helical ribbons. The reactors were heated by Dyna-Lume heat lamps; polymerization temperatures were held constant to 1° C. with either on-off (for the smaller reactors) or proportional (for the larger reactors) temperature controllers. The reactors were charged with styrene solutions of elastomers and peroxides were added. The systems were then heated to the desired temperature; styrene polymerization conversions were determined periodically by the pan solids method, and rates were calculated from the time when the system reached the desired temperature. Difficulty in removing the heat of polymerization of the styrene was encountered for some systems containing high loadings of peroxides; as long as stirring was continued, however, the temperature seldom exceeded 2° C. over the desired level. Thermal runaway was, however, noted in the center of some of the samples containing large amounts of peroxides after stirring was discontinued. The samples after stirring was completed, were batch-finished in reactor jars at 120° C. for 3 hours followed by 2 hours at a temperature rise of 10° C./hr, 4 hours at 140° C., and 8 hours at a temperature rise of 10° C./hr. The samples were then devolatized on a two-roll mill (one roll at 177° C. and the other at 204° C.) for 15 minutes, Wiley milled, compression molded, and tested by standard Shell and/or ASTM methods.

ANALYSES

Samples of reaction mixture from the stirred batch prepolymerizations were periodically removed from the reactor and analyzed for graft copolymer content. Iodine monochloride titration of the isolated graft polymers showed their composition to be with 3% of that indicated gravimetrically by the test; infrared spectroscopy showed the isolated polystyrene fractions always to contain less than 2% polybutadiene.

Haze measurements were determined on a Gardner HG-1204 Pivotable Sphere Hazemeter. Compression-molded films of the polymers 0.38 mm thick were placed between glass microscope slides with drops of General Electric Silicone Oil SF1271 between film and slide. This oil, a copolymer of dimethylsiloxane with a large fraction of diphenylsiloxane, was advantageous for minimizing haze due to surface roughness because its refractive index of 1.53 is close to the 1.59 value of polystyrene itself. (Aromatic hydrocarbon oils which match polystyrene even more closely in refractive index are not suitable because they dissolve polystyrene.) By this technique, compression-molded films of crystal polystyrene (Shell Chemical PS 202) gave haze readings from 2 to 3. The lower the haze value the more transparent is the polymer.

Sometimes one measure of toughness is better than another. The standard tests employed are notched Izod, unnotched Izod, and the Gardner FWIS, a falling weight technique. In order to obtain a single measure of toughness for correlation purposes, the results of these three tests were combined into a "Toughness Index", calculated as follows: T=[10×Izod (notched)+Izod (unnotched)+Gardner FWIS/2.5]/3.

A further measure employed in comparing polymers is a toughness-haze index which is the Toughness Index (as calculated above) divided by the Haze measurement (as discussed above) multiplied by 100.

ILLUSTRATIVE EMBODIMENT I

A group of interpolymers were prepared by thermal polymerization in the absence of initiators. The results are presented below in Table 2A. These results are presented for the purposes of comparison only. The amount of rubber employed in each case was 6 weight percent.

tion, and comparisons among different initiators in graft activity are therefore valid.)

In Tables 2B-2F, the initiators used are divided into classes and data for the polymer samples produced using the initiators in a given class are shown in each table.

Table 2B shows data for use of azobisisobutyronitrile (AIBN) and diacyl peroxides (LPO, APO, and BPO) in HIPS prepolymerization. As shown, AIBN (sample 66) tends to produce even less grafting than occurs during thermal polymerization at similar rates. Aliphatic diacyl peroxides (APO and LPO) produced grafting slightly below, or in the lower reaches of, the thermal range, while benzoyl peroxide produced grafting either similar to or slightly higher than that produced by thermal initiation alone. Table 2B shows that the mechanical and optical properties (impact strength and haze) of the polymers (or at least of those of comparable molecular weight) produced by the low-graft-activity initiators AIBN, LPO, and APO were roughly similar to those found for HIPS produced by thermal polymerization in similar systems. BPO-initiated interpolymerizates, however, showed improved clarity (lowered haze) but lowered mechanical strength.

Polymerizations initiated by aliphatic peroxyesters,

TABLE 2A

Grafting in Thermal Polymerization of Rubber Solutions in Styrene

| Run 1374-[a] | Rubber | Stirring Rate (rpm) | Temp. (°C.) | Prepolymerization Rate, %/Hr (Mean) | Conversion at End of Prepolymerization (%) | $M_w/M_n$ ($\times 10^{-3}$), GPC | Gel/Swell |
|---|---|---|---|---|---|---|---|
| 9A | Diene 55 | 30 | 125 | 10.8 | 32.5 | 258/79 | 23.4/6.6 |
| 26 | Diene 55 | 30 | 125 | 14.5 | 38.6 | 250/78 | 21.7/13.5 |
| 82 | Diene 55 | 30 | 125 | 7.1 | 19.5 | | 30.1/13.1 |
| 84 | Diene 55 | 30 | 125 | 8.1 | 22.8 | | 27.8/12.9 |
| 122 | Diene 55 | 30 | 130 | 12.0 | 27.0 | | 29.4/13.3 |
| 150 | Taktene 1202 | 30 | 130 | 10.8 | 26.5 | | 19.5/16.2 |
| 156 | Taktene 1202 | 250 | 130 | 14.2 | 26.2 | | 15.1/13.9 |
| 142 | Stereon 720 | 30 | 130 | 11.6 | 28.6 | | 18.2/13.8 |
| 148 | Stereon 720 | 250 | 130 | 13.8 | 28.6 | | 10.7/13.7 |

| Run 13742-[a] | Rubber | Izod, N/UN, J/m (ft-lb/in) | Gardner FWIS, kJ/m (ft-lb/in) | Toughness Index (35) | Haze (0.38 mm film) |
|---|---|---|---|---|---|
| 9A | Diene 55 | 53/438 (0.99/8.2) | 0.57 (10.7) | 7.5 | 70 |
| 26 | Diene 55 | 48/539 (0.90/10.1) | 0.67 (12.5) | 8.0 | 73 |
| 82 | Diene 55 | 53/940 (1.00/17.6) | | | 77 |
| 84 | Diene 55 | 55/849 (1.03/15.9) | 3.01 (56.4) | 16.3 | 68 |
| 122 | Diene 55 | 57/769 (1.06/14.4) | 2.66 (49.9) | 15.0 | 74 |
| 150 | Taktene 1202 | 70/753 (1.32/14.1) | 2.97 (55.6) | 16.5 | 77 |
| 156 | Taktene 1202 | 81/390 (1.52/7.3) | 3.54 (66.3) | 16.3 | 83 |
| 142 | Stereon 720 | 49/347 (0.92/6.5) | 1.88 (35.3) | 9.9 | 72 |
| 148 | Stereon 720 | 25/128 (0.46/2.4) | 0.42 (7.9) | 3.2 | 71 |

[a]Runs of numbers below 13472-80 conducted in 300 g batch reactors; others in 650 g reactor.

GRAFTING WITH INITIATORS

As shown below, there is a very large range of grafting rates obtainable in HIPS prepolymerization through the use of peroxide and azo initiators, with the amount of grafting obtainable at each conversion level ranging from below the thermal level for the least graft-active initiators to almost twice the thermal grafting level for the initiators of highest graft activity. (In all polymerizations except for a few with the high-temperature dialkyl peroxides, the rate of radical initiator decomposition exceeded the thermal self-initiation rate of styrene at the same temperature by at least a factor of 4. Hence the vast majority of the initiating—and graft-active—radicals in the systems were produced from the added initiator rather than from thermal styrene initiashown in Table 2C, were of two types. Standard peroxyesters which fragment to give an alkoxy plus an aliphatic acyloxy radical, such as TBPA, TBPO, and bis(TBPO), produced grafting-conversion curves in the upper levels of the thermal range or slightly above this range. Haze values for HIPS samples produced with these initiators were somewhat lower (at 45–60) than for samples obtained thermally, and notched Izod impact strengths were generally below 50 J/m. With one of the aliphatic peroxyesters, OO-t-butyl O-isopropyl monoperoxycarbonate (TBIC), however, rates of grafting were much higher, almost twice the thermal rate for some experiments. Samples of HIPS produced with this initiator were quite translucent (haze levels 30–45), although impact strength was considerably lower than for thermal interpolymerizates with the same rubber loading (notched Izod 35–45 J/m).

Aromatic peroxyesters (Table 2D) gave grafting rates uniformly much above the thermal range and comparable to those obtained with OO-t-butyl O-isopropyl monoperoxycarbonate. T-butyl peroxybenzoate (TBPB) produced grafting levels considerably higher than those obtainable thermally (though not quite as high as those obtainable with TBIC) and yielded finished HIPS samples which were quite translucent (haze 25–40), but similarly had somewhat lower impact strength (notched Izod 35–45 J/m) than had thermally polymerized samples (50–60 J/m). Although bisperoxide analogs of TBPB such as di-t-butyl diperoxyphthalate and bis(TBPB) (Table 1) produced very high grafting in HIPS preparations comparable to that obtainable with TBIC, the bisperoxides, for reasons not definitely known, were much less effective than TBPB or TBIC in producing low-haze samples. Although the samples obtained with bisperoxides were generally somewhat higher in molecular weight, the haze value of sample 186 prepared with bis(TBPB) was much higher than that of sample 70 prepared with TBPB or that of sample 168 prepared with TBIC, although the three finished samples were similar in molecular weight distribution.

When dialkyl peroxides (Table 2E) were used in HIPS prepolymerizations, quite strongly increased levels of grafting were obtained yielding HIPS samples with moderate to good translucence. However, dialkyl peroxides tend to have quite slow decomposition rates at the temperatures generally used for thermal polymerization. Much of the peroxide then remains undecomposed through the prepolymerization until the unstirred finishing stage, when much higher temperatures are used decomposing the peroxide and causing the formation of large amounts of low-molecular-weight polymer. Hence the number-average molecular weights of polymer samples prepared with high levels of dialkyl peroxides (90 and 182) were quite low, and impact strength was poor. The reason for the lessened ability of dialkyl peroxides to reduce sample haze for a given amount of grafting in comparison with TBPB and TBIC is not known; the aromatic peroxyester bisperoxides, as indicated earlier, also share this dificiency.

The grafting effect of methyl ethyl ketone peroxide, a peroxide mixture prepared by reacting $H_2O_2$ with methyl ethyl ketone and containing peroxyketal, peroxyhemiketal, and hydroperoxide groups, was also determined in HIPS prepolymerizations (Table 2E). Grafting obtained in polymerizations using this peroxide was low, below the thermal range, while haze and mechanical properties of HIPS samples prepared using this initiator resembled those of thermally initiated material (Table 2E). Although this peroxide mixture contains some dialkyl peroxide and peroxyketal groups, it is composed largely of hydroperoxides, which cause some initiation of styrene polymerization but tend to react with styrene predominantly by a nonradical mechanism initiating no polymer chains and evidently also producing no grafting.

Peroxyketals (Table 2F) produced quite mixed results when tested as initiators. Two of the peroxyketals, 2,2-bis(t-butylperoxy)butane and 1,1-bis(t-butylperoxy)cyclohexane, gave rise to grafting levels within the range observed for thermally initiated polymerization. Haze and impact strength of the resultant interpolymerizates were also similar to the values observed for thermally polymerized materials providing the polymers were not too low in molecular weight. The more sterically hindered peroxyketal, 1,1-bis(t-butylperoxy)-3,3,5-trimethylcyclohexane, however, gave grafting considerably above thermal levels with correspondingly translucent polymers (haze less than 40 in some cases).

TABLE 2B

Use of Azo Compounds and Diacyl Peroxides in Styrene-Polybutadiene Interpolymerization[a]

| Run 13742-[b] | Initiator | (Mole %) | Temp. (°C.)[c] | Prepolymerization Rate, %/Hr (Mean) | Conversion at End of Prepolymerization (%) | $M_w/M_n$ ($\times 10^{-3}$) GPC | Gel/Swell |
|---|---|---|---|---|---|---|---|
| Azo Compounds: | | | | | | | |
| 66 | AIBN | 0.024 | 64–102 | 9.7 | 36.5 | 240/74 | 10.4/16.5 |
| Diacyl Peroxides: | | | | | | | |
| 48 | LPO | 0.024 | 78–125 | 7.8 | 27.9 | 242/79 | 16.0/12.6 |
| 12 | LPO | 0.2 | 80–125 | 20.2 | 50.5 | 170/51 | 45.8/9.11 |
| 46 | APO | 0.024 | 87–125 | 9.4 | 32.9 | 243/75 | 13.0/13.2 |
| 104 | APO | 0.064 | 87–105 | 13.0 | 32.4 | | 28.7/13.3 |
| 44 | BPO | 0.024 | 90–125 | 12.8 | 34.0 | 245/74 | 16.5/14.5 |
| 102 | BPO | 0.064 | 90–108 | 14.6 | 34.9 | | 23.2/12.8 |
| 14 | BPO | 0.2 | 85–95 | 24.3 | 43.0 | 129/37 | 23.4/7.3 |

| Run 13742-[b] | Initiator | Izod, N/UN, J/m (ft-lb/in) | Gardner FWIS, kJ/m (ft-lb/in) | Toughness Index (35) | Haze (0.38 mm film) |
|---|---|---|---|---|---|
| Azo Compounds: | | | | | |
| 66 | AIBN | 49/523 (0.92/9.8) | 1.35 (25.2) | 9.7 | 72 |
| Diacyl Peroxides: | | | | | |
| 48 | LPO | 48/598 (0.89/11.2) | 0.60 (11.2) | 8.2 | 73 |
| 12 | LPO | 38/411 (0.71/7.7) | 0.22 (4.2) | 5.5 | 90 |
| 46 | APO | 42/497 (0.79/9.3) | 0.50 (9.4) | 7.0 | 64 |
| 104 | APO | 48/721 (0.89/13.5) | 2.25 (42.2) | 13.1 | 75 |
| 44 | BPO | 42/384 (0.78/7.2) | 0.26 (4.9) | 5.7 | 45 |
| 102 | BPO | 49/630 (0.91/11.8) | 2.28 (42.7) | 12.7 | 57 |
| 14 | BPO | 23/144 (0.43/2.7) | 0.05 (1.0) | 2.5 | 48 |

[a] Polymerizations with 6% Diene 55 solution in styrene, 30 rpm stirrer speed.
[b] Runs of numbers below 13472-80 conducted in 300 g batch reactors; others in 650 g reactor.
[c] Range indicates temperature increased between these limits during prepolymerization.

TABLE 2C

Use of Aliphatic Peroxyesters in Styrene-Polybutadiene Interpolymerization[a]

| Run 13742- | Initiator | (Mole %) | Temp. (°C.)[c] | Prepolymerization Rate, %/Hr (Mean) | Conversion at End of Prepolymerization (%) | $M_w/M_n$ (33 10$^{-3}$) GPC | Gel/Swell |
|---|---|---|---|---|---|---|---|
| 86 | TBPO | 0.024 | 92–112 | 10.7 | 32.1 | 220/68 | 30.0/12.1 |
| 88 | TBPA | 0.024 | 112–117 | 11.8 | 30.5 | 249/78 | 32.2/11.8 |
| 64 | bis(TBPO) | 0.012 | 85–112 | 8.4 | 25.1 | 264/82 | 23.6/13.9 |
| 168 | TBIC | 0.024 | 113 | 10.0 | 30.3 | 230/73 | 40.9/10.9 |
| 198 | TBIC | 0.024 | 120 | 14.8 | 30.4 | 227/69 | 35.9/11.0 |
| 13972-65 | TBIC | 0.024 | 125 | 24.2 | 32.3 | 204/69 | 23.5/13.8 |
| 170 | TBIC | 0.064 | 113–114 | 17.5 | 31.3 | 190/65 | 33.4/12.6 |

| Run 13742- | Initiator | Izod, N/UN, J/m (ft-lb/in) | Gardner FWIS, kJ/m (ft-lb/in) | Toughness Index (35) | Haze (0.38 mm film) |
|---|---|---|---|---|---|
| 86 | TBPO | 45/726 (0.84/13.6) | 2.56 (47.9) | 13.7 | 48 |
| 88 | TBPA | 58/844 (0.90/15.8) | 2.43 (45.6) | 14.4 | 48 |
| 64 | bis(TBPO) | 52/427 (0.98/8.0) | 0.89 (16.7) | 8.2 | 57 |
| 168 | TBIC | 45/860 (0.85/16.1) | 1.75 (32.7) | 11.8 | 44 |
| 198 | TBIC | 42/577 (0.79/10.8) | 1.77 (33.1) | 10.6 | 43 |
| 13972-65 | TBIC | 35/481 (0.65/9.0) | 1.12 (21.0) | 8.0 | 33 |
| 170 | TBIC | 44/641 (0.83/12.0) | 1.15 (21.6) | 9.2 | 30 |

[a]Polymerizations with 6% Diene 55 solution in styrene, 30 rpm stirrer speed.
[b]Range indicates temperature increased between these limits during prepolymerization.

TABLE 2D

Use of Aromatic Peroxyesters in Styrene-Polybutadiene Interpolymerization[a]

| Run 13742-[b] | Initiator | (Mole, %) | Temp. (°C.)[c] | Prepolymerization Rate, %/Hr (Mean) | Conversion at End of Prepolymerization (%) | $M_w/M_n$ ($\times 10^{-3}$) GPC | Gel/Swell |
|---|---|---|---|---|---|---|---|
| 13972-25 | TBPB | 0.0148 | 125 | 17.6 | 31.0 | 225/76 | 33.7/12.2 |
| 70 | TBPB | 0.024 | 110–115 | 12.6 | 40.4 | 225/70 | 31.7/11.3 |
| 196 | TBPB | 0.024 | 125 | 15.0 | 30.8 | 227/70 | 35.1/11.1 |
| 50 | TBPB | 0.064 | 110 | 17.6 | 30.9 | 197/60 | 27.41/13.6 |
| 110 | TBPB | 0.064 | 118 | 21.7 | 38.0 | 187/58 | 28.0/13.4 |
| 164 | di-t-butyl diperoxyphthalate | 0.012 | 118–122 | 10.6 | 32.8 | 269/79 | 36.2/10.3 |
| 166 | di-t-butyl diperoxyphthalate | 0.032 | 118–122 | 15.9 | 33.0 | 242/67 | 39.5/10.7 |
| 184 | bis(TBPB) | 0.012 | 118 | 13.0 | 32.4 | 268/83 | 38.1/8.4 |
| 186 | bis(TBPB) | 0.032 | 118 | 19.6 | 31.0 | 223/66 | 38.6/9.1 |

| Run 13742-[b] | Initiator | Izod, N/UN, J/m (ft-lb/in) | Gardner FWIS, kJ/m (ft-lb/in) | Toughness Index (35) | Haze (0.38 mm film) |
|---|---|---|---|---|---|
| 13972-25 | TBPB | 46/625 (0.86/11.7) | 1.98 (37.0) | 11.7 | 46 |
| 70 | TBPB | 42/256 (0.78/4.8) | 0.29 (5.4) | 4.9 | 39 |
| 196 | TBPB | 45/368 (0.85/6.9) | 1.05 (19.7) | 7.8 | 40 |
| 50 | TBPB | 37/358 (0.70/6.7) | 0.70 (13.2) | 6.3 | 28 |
| 110 | TBPB | 35/539 (0.66/10.1) | 1.67 (31.3) | 9.7 | 30 |
| 164 | di-t-butyl | 52/918 (0.98/17.2) | 3.23 (60.5) | 17.0 | 57 |
| 166 | di-t-butyl diperoxyphthalate | 42/865 (0.78/16.2) | 2.41 (45.2) | 14.0 | 47 |
| 184 | bis(TBPB) | 44/630 (0.82/11.8) | 1.62 (30.4) | 10.7 | 57 |
| 186 | bis(TBPB) | 36/710 (0.67/13.3) | 1.09 (20.4) | 8.9 | 53 |

[a]Polymerizations with 6% Diene 55 solution in styrene, 30 rpm stirrer speed.
[b]Runs of numbers below 13472-80 conducted in 300 g batch reactor; others in 650 g reactor.
[c]Range indicates temperature increased between these limits during prepolymerization.

TABLE 2E

Use of Dialkyl Peroxides and Ketone Peroxides in Styrene-Polybutadiene Interpolymerization[a]

| Run 13742-[b] | Initiator | (Mole %) | Temp. (°C.)[c] | Prepolymerization Rate, %/Hr (Mean) | Conversion at End of Prepolymerization (%) | $M_w/M_n$ ($\times 10^{-3}$) GPC | Gel/Swell |
|---|---|---|---|---|---|---|---|
| Dialkyl Peroxides: | | | | | | | |
| 180 | DITBP | 0.024 | 125 | 9.8 | 30.3 | 240/70 | 37.1/8.5 |
| 182 | DITBP | 0.064 | 125 | 12.7 | 30.8 | 197/48 | 38.1/8.1 |
| 62 | DICUP | 0.024 | 115–122 | 7.1 | 28.2 | 241/70 | 23.7/13.9 |
| 90 | DICUP | 0.064 | 120 | 14.8 | 32.0 | 198/49 | 36.0/10.7 |
| 60 | bis(DITBP) | 0.012 | 118–123 | 7.8 | 31.2 | 258/66 | 25.8/10.4 |
| Ketone Peroxides: | | | | | | | |

TABLE 2E-continued

Use of Dialkyl Peroxides and Ketone Peroxides in Styrene-Polybutadiene Interpolymerization[a]

| 74 | Methyl Ethyl | 0.064 | 115 | 12.6 | 37.7 | 267/77 | 23.9/12.0 |
|---|---|---|---|---|---|---|---|
| 13972-33 | Ketone Peroxide | 0.064 | 125 | 22.8 | 30.2 | 222/67 | 33.6/11.1 |

| Run 13742-[b] | Initiator | Izod, N/UN, J/m (ft-lb/in) | Gardner FWIS, kJ/m (ft-lb/in) | Toughness Index (35) | Haze (0.38 mm film) |
|---|---|---|---|---|---|
| Dialkyl Peroxides: | | | | | |
| 180 | DITBP | 42/731 (0.78/13.7) | 1.51 (28.3) | 10.9 | 57 |
| 182 | DITBP | 30/504 (0.56/9.44) | 0.82 (15.4) | 7.1 | 38 |
| 62 | DICUP | 50/384 (0.94/7.2) | 0.95 (17.8) | 7.9 | 54 |
| 90 | DICUP | 36/561 (0.68/10.5) | 1.85 (34.6) | 10.4 | 48 |
| 60 | bis(DITBP) | 42/358 (0.78/6.7) | 1.25 (23.5) | 8.0 | 56 |
| Ketone Peroxides: | | | | | |
| 74 | Methyl Ethyl | 56/598 (1.04/11.2) | 1.82 (34.0) | 11.7 | 73 |
| 13972-33 | Ketone Peroxide | 49/731 (0.92/13.7) | 1.82 (34.0) | 12.2 | 71 |

[a]Polymerizations with 6% Diene 55 solution in styrene, 30 rpm stirrer speed.
[b]Runs of numbers below 13472-80 conducted in 300 g batch reactor; others in 650 g reactor.
[c]Range indicates temperature increased between these limits during polymerization.

TABLE 2F

Use of Peroxyketals in Styrene-Polybutadiene Interpolymerization[a]

| Run 13742- | Initiator | (Mole %) | Temp. (°C.) | Prepolymerization Rate, %/Hr (Mean) | Conversion at End of Prepolymerization (%) | $M_w/M_n$ ($\times 10^{-3}$) GPC | Gel/Swell |
|---|---|---|---|---|---|---|---|
| 13972-45 | 2,2-bis(t-butylperoxy) | 0.012 | 115–118 | 10.9 | 27.6 | 233/74 | 35.1/12.4 |
| 13972-47 | butane | 0.032 | 115–118 | 18.7 | 36.5 | 179/60 | 35.4/12.8 |
| 13972-29 | 1,1-bis(t-butylperoxy) | 0.012 | 107–115 | 9.4/11.6 | 26.6 | 263/81 | 37.7/12.6 |
| 13972-31 | cyclohexane | 0.032 | 107 | 15/18.4 | 26.3 | 232/68 | 34.8/12.5 |
| 160 | 1,1-bis-t-butylperoxy) | 0.012 | 107–110 | 8.4 | 25.2 | 257/76 | 35.2/10.4 |
| 13972-5 | 3,3,5-trimethylcyclo- | 0.024 | 118 | 21.3 | 32.6 | 246/75 | 31.3/12.2 |
| 162 | hexane | 0.032 | 107 | 14.2 | 28.1 | 228/69 | 35.2/11.3 |

| Run 13742- | Initiator | Izod, N/UN, J/m (ft-lb/in) | Gardner FWIS, kJ/m (ft-lb/in) | Toughness Index (35) | Haze (0.38 mm film) |
|---|---|---|---|---|---|
| 13972-45 | 2,2-bis(t-butylperoxy) | 50/614 (0.94/11.5) | 1.77 (33.2) | 11.4 | 54 |
| 13972-47 | butane | 40/454 (0.74/8.5) | 1.54 (28.9) | 9.2 | 39 |
| 13972-29 | 1,1-bis(t-butylperoxy) | 51/518 (0.95/9.7) | 1.77 (33.2) | 10.8 | 55 |
| 13972-31 | cyclohexane | 44/379 (0.82/7.1) | 1.70 (31.8) | 9.3 | 47 |
| 160 | 1,1-bis-t-butylperoxy) | 48/614 (0.89/11.5) | 2.40 (45.0) | 12.8 | 43 |
| 13972-5 | 3,3,5-trimethylcyclo- | 52/603 (0.97/11.3) | 1.67 (31.2) | 11.2 | 47 |
| 162 | hexane | 40/763 (0.75/14.3) | 1.33 (25.0) | 10.6 | 34 |

[a]Polymerizations with 6% Diene 55 solution in styrene, 30 rpm stirrer speed.
[b]Range indicates temperature increased between these limits during prepolymerization.

ILLUSTRATIVE EMBODIMENT II

Table 3 lists the properties of a number of low-haze samples prepared using TBPB initiator with Diene 55 and Taktene 1202 at different levels. These samples were the ones having the maximum amount of toughness per unit haze of the entire group of samples listed above.

As shown in Table 3, run 13972-121 employing Taktene 1202 (according to the invention) had the best toughness-haze index value comparable to the use of Diene 55 (run 13742-138, not according to the invention) at a 50% greater rubber loading. Further, analysis of these two samples by scanning transmission electron microscopy (STEM) of OsO₄-stained samples showed the presence of a mixture of coil-shaped, capsule-shaped and bar-shaped particles for the sample made with Taktene 1202 yet mainly just coil-shaped particles for the sample made with Diene 55. This difference in morphology was not expected.

The last two entries in Table 3 show data for two materials prepared according to the same procedure used with the other samples except that 0.1 weight % of allyl bromide was added to the polymerization mixture. It can be seen that the addition of allyl bromide, although it produced a lowering of haze, had a deleterious effect in that it reduced toughness-haze index.

TABLE 3
Low-Haze Samples with Optimal Haze-Toughness Balance Produced with Initiators[a]

| Run | Rubber (wt. %) in Feed | TBPB (Mole %) | Temp. (°C.)[b] | Prepolymerization Rate, %/Hr (Mean) | Conversion at End of Prepolymerization (%) | Gel/Swell |
|---|---|---|---|---|---|---|
| 13742-92 | Diene 55 (9%) | 0.024 | 115-120 | 11.7 (115° C.) | 32.9 | 38.8/12.0 |
| 13972-41 | Taktene 1202 (6%) | 0.024 | 125 | 19.7 | 31.3 | 28.0/14.1 |
| 13742-138 | Diene 55 (9%) | 0.064 | 118 | 22.8 | 32.6 | 41.3/11.7 |
| 13972-121 | Taktene 1202 (6%) | 0.032 | 125 | 26.2 | 46.4 | 18.6/18.3 |
| 13972-115 | Diene 55 (6%) | 0.032 | 125 | 26.4 | 35.3 | 29.1/14.3 |
| 13742-192 | Diene 55 (9%) | 0.064 | 118 | 20.1 | 44.6 | 42.5/11.7 |
| 13742-110 | Diene 55 (6%) | 0.064 | 118 | 26.4 | 38.0 | 28.0/13.4 |
| 13742-140[c] | Diene 55 (9%) | 0.064 | 118 | 24-28 | 36.1 | 27.8/12.7 |
| 13972-61B | Taktene 1202 (6%) | 0.064 | 120 | 27.2 | 35.0 | 14.6/18.8 |
| 13972-57 | Stereon 720 (6%) | 0.064 | 120 | 28.7 | 34.1 | 13.3/14.8 |
| 13972-11[c] | Stereon 720 (12%) | 0.064 | 120 | 30.4 | 52.6 | 7.0/17.8 |
| 13742-122 | Diene 55 (6%) | None | 130 | 12.0 | 27.0 | 29.4/13.3 |
| 14351-91 | Diene 55 (6%) (d) | 0.024 | 118 | 22.8 | 37.6 | 34.8/14.2 |
| 14351-93 | Diene 55 (6%) (d) | 0.064 | 118 | 26.7 | 39.5 | 33.6/13.4 |

| Run | Rubber (wt. %) in Feed | Gel/Rubber Ratio | Izod, N/UN, J/m (ft-lb/in) | Gardner FWIS, kJ/m (ft-lb/in) |
|---|---|---|---|---|
| 13742-92 | Diene 55 (9%) | 4.2 | 60/929 (1.13/17.4) | 3.15 (59.1) |
| 13972-41 | Taktene 1202 (6%) | 4.1 | 62/726 (1.16/13.6) | 2.86 (53.6) |
| 13742-138 | Diene 55 (9%) | 4.6 | 52/705 (0.98/13.2) | 3.03 (56.7) |
| 13972-121 | Taktene 1202 (6%) | 3.2 | 74/758 (1.38/14.2) | 2.28 (42.7) |
| 13972-115 | Diene 55 (6%) | 4.8 | 51/913 (0.95/17.1) | 1.09 (20.4) |
| 13742-192 | Diene 55 (9%) | 4.8 | 52/673 (0.98/12.6) | 2.47 (46.2) |
| 13742-110 | Diene 55 (6%) | 4.3 | 35/545 (0.66/10.2) | 1.67 (31.3) |
| 13742-140[c] | Diene 55 (9%) | 3.2 | 44/326 (0.82/6.1) | 1.99 (37.3) |
| 13972-61B | Taktene 1202 (6%) | 2.5 | 40/246 (0.74/4.6) | 1.06 (19.9) |
| 13972-57 | Stereon 720 (6%) | 2.1 | 21/105 (0.40/2.0) | 0.29 (5.4) |
| 13972-11[c] | Stereon 720 (12%) | 0.6 | 21/100 (0.39/1.9) | 0.10 (1.8) |
| 13742-122 | Diene 55 (6%) | 4.6 | 57/769 (1.06/14.4) | 2.66 (49.9) |
| 14351-91 | Diene 55 (6%) (d) | 5.7 | 37/235 (0.70/4.4) | 0.29 (5.4) |
| 14351-93 | Diene 55 (6%) (d) | 5.6 | 10/112 (0.19/2.1) | 0.22 (4.1) |

| Run | Rubber (wt. %) in Feed) | Toughness Index (35) | Haze (0.38 mm film) | Toughness/Haze × 100 |
|---|---|---|---|---|
| 13742-92 | Diene 55 (9%) | 17.5 | 53 | 33 |
| 13972-41 | Taktene 1202 (6%) | 15.5 | 47 | 33 |
| 13742-138 | Diene 55 (9%) | 15.2 | 36 | 42 |
| 13972-121 | Taktene 1202 (6%) | 15.0 | 36 | 42 |
| 13972-115 | Diene 55 (6%) | 11.6 | 40 | 29 |
| 13742-192 | Diene 55 (9%) | 13.6 | 41 | 33 |
| 13742-110 | Diene 55 (6%) | 9.7 | 30 | 32 |
| 13742-140[c] | Diene 55 (9%) | 9.7 | 29 | 33 |
| 13972-61B | Taktene 1202 (6%) | 6.6 | 22 | 30 |
| 13972-57 | Stereon 720 (6%) | 2.7 | 14 | (19) |
| 13972-11[c] | Stereon 720 (12%) | 2.2 | 12 | (18) |
| 13742-122 | Diene 55 (6%) | 15.0 | 74 | 20 |
| 14351-91 | Diene 55 (6%) (d) | 4.5 | 20 | 22 |
| 14351-93 | Diene 55 (6%) (d) | 1.9 | 11 | 17 |

[a]Stirrer speed 30 rpm.
[b]Range indicates temperature increase within these limits during prepolymerization.
[c]Stirrer speed 250 rpm.
[d]0.1 weight % allyl bromide included in polymerization mixture.

What is claimed is:

1. A process for the free-radical polymerization of a monovinyl aromatic monomer consisting essentially of:
   (a) preparing a solution of about 4 to about 12 parts by weight of a polybutadiene rubber per 100 parts by weight of combined rubber and monovinyl aromatic monomer, said polybutadiene rubber having a cis-1,4 content of about 80% to about 98%, a trans-1,4 content of about 1% to about 19%, and a vinyl-1,2 content of about 1% to about 19%,
   (b) heating the resulting solution with agitation and in the presence of about 0.01 to about 1 mole percent (based on the moles of monovinyl aromatic) of a free-radical initiator of t-butyl peroxybenzoate until about 25 to about 50 weight percent of the monovinyl aromatic is converted to polymer; and
   (c) bulk polymerizing the resulting mixture in the absence of additional agitation at progressively increasing temperatures up to about 180° C. until about 75 to about 98 weight percent conversion of monomer to polymer, to provide a monovinyl aromatic polymer having an improved balance of translucency and impact, the structure of the monovinyl aromatic polymer comprising a continuous matrix of poly(monovinyl aromatic) having a dispersed phase of a reinforcing polybutadiene rubber, the rubber being present in a proportion of about 6 to about 9 parts by weight per one hundred parts by weight of the combined poly(monovinyl aromatic) and rubber, the rubber being in the form of a plurality of particles of generally cellular structure and containing occlusions of poly(monovinyl aromatic), the particles being a mixture of coil-shaped, capsule-shaped and bar-shaped particles having a weight average particle diameter not exceeding two microns and cell walls not greater than about 0.05 microns in thickness, the resulting polymer having a toughness-haze index of greater than about 30.

2. The process of claim 1, wherein the polybutadiene rubber has a cis 1,4 content of about 98%, a trans 1,4 content of about 1%, a vinyl 1,2 content of about 1% and an inherent viscosity of about 1.9 grams per deciliter.

3. The process of claims 1 or 6, wherein the weight percent of polybutadiene rubber in the resulting polymer is six percent, the amount of initiator is about 0.032 mole percent, and the temperature during polymerization is maintained between about 100° C. and about 140° C.

4. The process of claim 1, wherein the polymerization process is a batch-type process.

5. The product obtained by the process of claim 3.

* * * * *